US00RE37880E

(19) United States
(12) Reissued Patent
Fujimori

(10) Patent Number: US RE37,880 E
(45) Date of Reissued Patent: Oct. 15, 2002

(54) PROJECTOR

(75) Inventor: Motoyuki Fujimori, Suwa (JP)

(73) Assignee: Seiko Epson Corporation, Tokyo (JP)

(21) Appl. No.: 09/662,111

(22) PCT Filed: Mar. 1, 1996

(86) PCT No.: PCT/JP96/00518

§ 371 (c)(1),
(2), (4) Date: Feb. 3, 1997

(87) PCT Pub. No.: WO96/27151

PCT Pub. Date: Sep. 6, 1996

Related U.S. Patent Documents

Reissue of:
(64) Patent No.: 5,806,952
Issued: Sep. 15, 1998
Appl. No.: 08/727,461
Filed: Feb. 3, 1997

(30) Foreign Application Priority Data

Mar. 1, 1995 (JP) ..... 7-042004

(51) Int. Cl.[7] ..... G03B 21/14
(52) U.S. Cl. ..... 353/119; 353/57
(58) Field of Search ..... 353/119, 31, 34, 353/37, 52, 57, 60, 61

(56) References Cited

U.S. PATENT DOCUMENTS

| | | | |
|---|---|---|---|
| 5,187,510 | A | 2/1993 | Vogeley et al. |
| 5,418,586 | A | 5/1995 | Fujimori et al. |
| 5,605,390 | A | 2/1997 | Brice et al. |

FOREIGN PATENT DOCUMENTS

| | | |
|---|---|---|
| JP | 62-262035 | 11/1987 |
| JP | 63-235923 | 9/1988 |
| JP | 64-9231 | 1/1989 |
| JP | 64-36165 | 2/1989 |
| JP | 1-158480 | 6/1989 |
| JP | 1-293385 | 11/1989 |
| JP | 1-302387 | 12/1989 |
| JP | 2-195382 | 8/1990 |
| JP | 3-132787 | 6/1991 |
| JP | 4-100184 | 4/1992 |
| JP | 4-141648 | 5/1992 |
| JP | 5-5948 | 1/1993 |
| JP | 5-93957 | 4/1993 |
| JP | 5-188342 | 7/1993 |
| JP | 6-82765 | 3/1994 |
| JP | 6-186522 | 7/1994 |
| JP | 7-15537 | 2/1995 |

*Primary Examiner*—William Dowling
(74) *Attorney, Agent, or Firm*—Oliff & Berridge, PLC

(57) ABSTRACT

Projection display apparatus 1 includes light source lamp unit 8, optical lens unit 9, projection lens unit 6, and power supply unit 7. Projection lens unit 6 is disposed in the front part of outside case 2, light source lamp unit 8 is disposed in the back part of the outside case of the apparatus, and between these units 6 and 8 optical lens unit 9 and power supply unit 7 are disposed in a vertically stacked arrangement with optical lens unit 9 on the top and power supply unit 7 on the bottom. Because these large units 9 and 7 are vertically stacked, the front-back and right-left dimensions (i.e. length and width) of the overall apparatus can be reduced. An apparatus 1 that is easily portable and does not require a large installation space can therefore be achieved. Because the heavy power supply unit 7 is on the bottom, apparatus 1 is also stable when placed on a table, etc.

8 Claims, 4 Drawing Sheets

PROJECTOR

Matter enclosed in heavy brackets [ ] appears in the original patent but forms no part of this reissue specification; matter printed in italics indicates the additions made by reissue.

FIELD OF TECHNOLOGY

The present invention relates to a projection display apparatus for separating a white light beam from a light source into three colored light beams, specifically red, blue, and green, passing each of these colored light beams through a light valve composed of a liquid crystal panel for modulation according to the image information, and then after modulation recombining the modulated light beams of each color through a projection lens for projection enlargements to a screen. More specifically, the present invention relates to the arrangement of the components comprising such a projection display apparatus.

BACKGROUND OF THE INVENTION

A projection display apparatus basically comprises a light source lamp unit, an optical lens unit, a projection lens unit, a power supply unit, and a circuit board group on which the control circuitry, etc., is mounted. The white light beam emitted from the light source lamp unit is optically processed by the optical lens unit to synthesize a color image according to the image information. After processing, the combined light beam is projected by the projection lens unit onto a screen.

Except for the projection lens unit, each of these components is disposed within the apparatus' outside case. The projection lens unit is mounted with the front thereof projecting from the front of the apparatus. An operating panel with the power switch, etc., and a receptor window for the remote control, are disposed on the outer surface of the outside case.

If this type of projection display apparatus was made compact and light weight to ease its transportation, it would be possible to view color images on a large screen in any desired location, which would be convenient.

However, the various units assembled inside a conventional projection display apparatus are arranged on the same horizontal plane. As a result, the length and width of the apparatus are large and it is therefore inconvenient to transport. When this projection display apparatus is placed on a table or desk, it occupies a large area, which is also inconvenient.

The likelihood of dropping the apparatus or colliding with walls, etc., it also increased when this projection display apparatus is transported. When the apparatus is impacted as a result of dropping or collision, the optical elements of the internal optical lens unit may become misaligned with each other, and the optical lens unit and light source lamp unit may become offset from each other. This may prevent appropriate color synthesis by the optical lens unit, resulting in color irregularities and lighting irregularities, and thus degraded projection image quality.

There are also projection display apparatuses including a drive unit for reading a floppy disk. PCMCIA card, or other recording medium, and constructed to form projection images corresponding to the read information. Appropriately positioning the drive unit in this type of projection display apparatus is important to reduce the size of the apparatus.

OBJECTS OF THE INVENTION

An object of the present invention is to reduce the length and width of the projection display apparatus by appropriately positioning within the outside case the various units comprising the projection display apparatus.

Another object of the present invention is to avoid deterioration of the projection image quality as a result of a misalignment occurring between the various units and between the optical elements in the units as a result of the projection display apparatus being impacted by dropping, collision, etc.

A further object of the present invention is to avoid increasing the size of a projection display apparatus by including a drive unit for reading a floppy disk, PCMCIA card, or other recording medium by appropriately positioning the drive unit.

SUMMARY OF THE INVENTION

To achieve the above objects in a projection display apparatus including: a light source lamp unit; an optical lens unit comprising a color separation means for separating the white light beam emitted from the light source lamp unit into colored light beams of the three primary colors, three light valves for modulating the light beams of each of the separated colors, and a color synthesis means for combining the modulated light beams of each of the modulated colors; a projection lens unit for projecting the combined modulated light beams onto a screen; a power supply unit; and an outside case in which each of the preceding units is assembled, the present invention positions the projection lens unit in the front part of the outside case, positions the light source lamp unit in the back part of the outside case, and positions the optical lens unit and power supply unit stacked vertically between the projection lens unit and light source lamp unit.

With this configuration, the large optical lens unit and power supply unit overlap vertically and, as a result, the length and width of the overall apparatus can be reduced.

In general, the power supply unit is positioned below the optical lens unit. The center of gravity of the apparatus is therefore low because the heavy power supply unit is positioned at the bottom when thus configures. As a result, the apparatus is stable when placed on a table, etc., and movement of the internal parts is less likely even when an impact force is applied to the side.

In addition to the above configuration, the optical lens unit may be constructed with a head panel as a structural member extending sideways or transversely in the apparatus with a horizontal panel part of the head panel also functioning as at least part of the shield case covering the power supply unit. When thus constructed, the apparatus can be made smaller and more compact by the amount both parts are used in common.

In a projection display apparatus that includes a drive unit for reading an information recording medium, the present invention uses a construction in which the drive unit is disposed between the bottom panel part of the outside case and the light source lamp unit. The present invention uses an arrangement in which the power supply unit and optical lens unit are vertically overlapping as described above. The height of these overlapping units is normally greater than the height of the light source lamp unit. As a result, dead space can be formed below the light source lamp unit. If this dead space is used to hold the drive unit, the size of the apparatus need not be increased to provide a drive unit.

Alternatively, the drive unit may be placed below the optical lens unit in an area not occupied by the power supply unit.

The light source lamp unit may also be fixed to, or formed as a single unit with, the optical lens unit in the present invention. In addition to this configuration, the light source lamp unit and projection unit are fixed to the head panel, which is a structural member of the optical lens unit. By using this configuration, the various units can be fastened together or integrated, and the overall rigidity can be increased. The optical axis will therefore not be offset between each of the units even when an impact force acts on the apparatus as a result of dropping or collision, etc. It is also possible to avoid misalignment between the optical elements in each unit.

A cooling fan is also disposed above the three light valve panels and optical lens unit in the present invention with air holes formed in the head panel to enable the forced air from the cooling fan to enter the optical lens unit, and intake holes formed in the power supply unit. With this configuration, the apparatus can be made small and compact, and the power supply unit can be efficiently cooled.

DESCRIPTION OF THE PREFERRED EMBODIMENTS OF THE INVENTION

A projection display apparatus of the present invention is described below with reference to the accompanying figures.

Overall Configuration

Figure 1A:
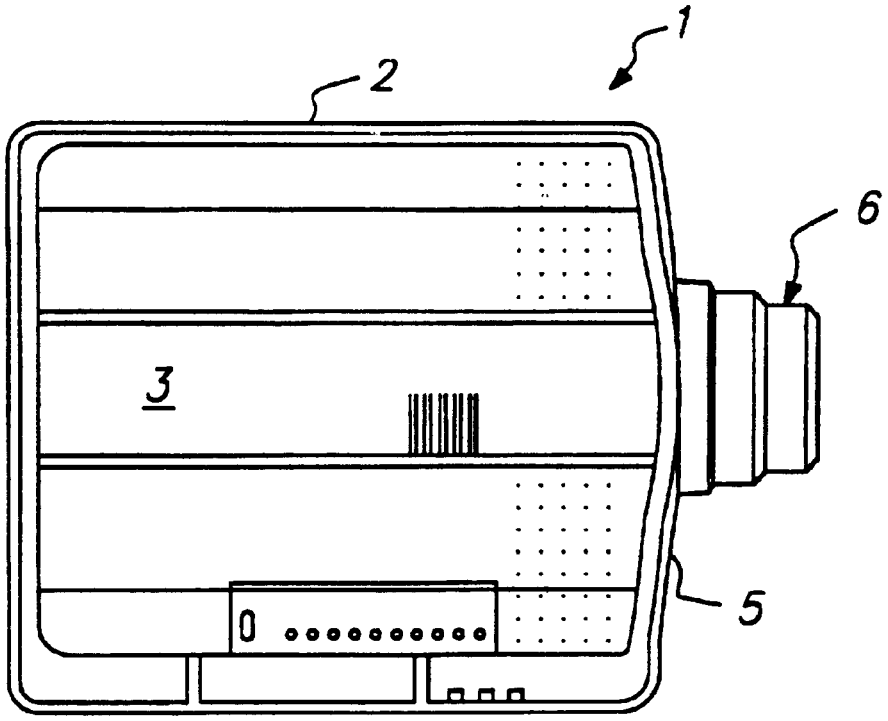
FIGS. 1A and B are a simplified plan view and a simplified side view, respectively, of the projection display apparatus of the present invention.
Figure 1B:
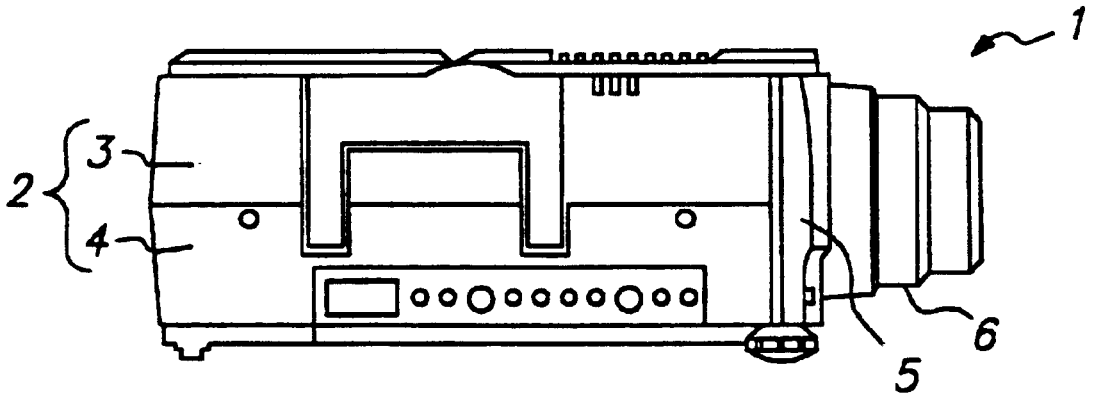

Plan and side views of a projection display apparatus according to the present embodiment are shown in FIGS. 1A and B, respectively. Projection display apparatus 1 of the present embodiment has an outside case 2 with a rectangular parallelpiped shape. Outside case 2 basically comprises upper case 3, lower case 4, and front case 5 defining the front surface of the apparatus. The front part of projection lens unit 6 projects from the middle of front case 5.

Figure 2A:
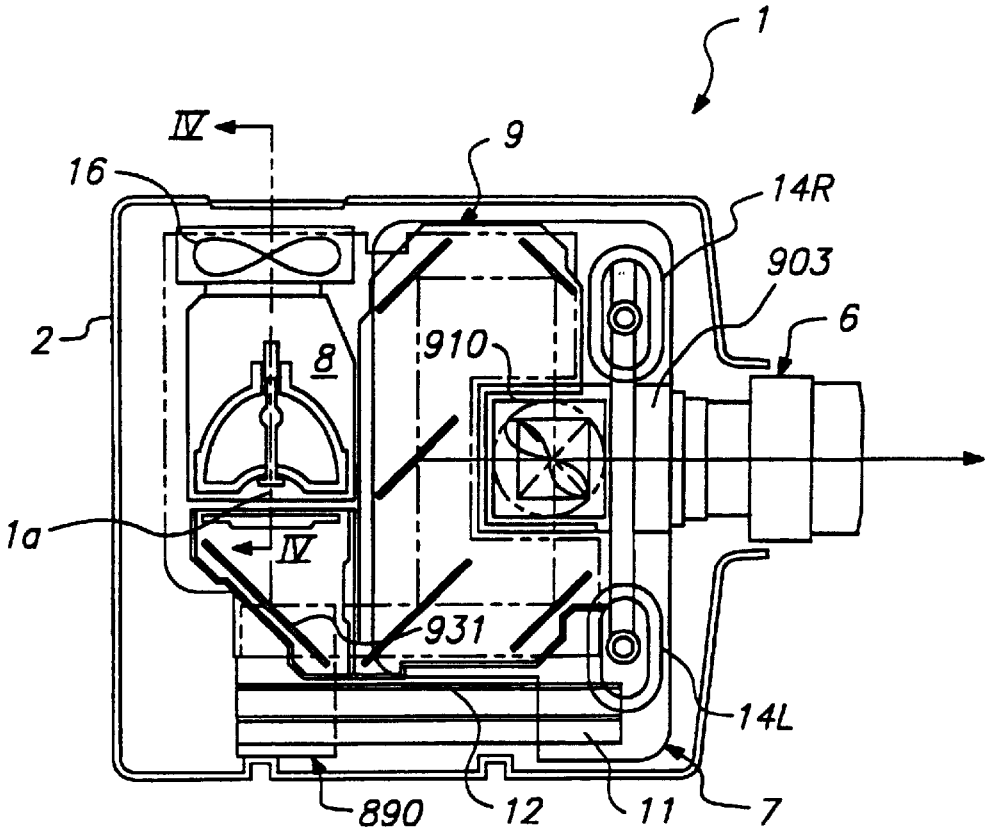
FIG. 2 shows the arrangement of each unit disposed inside the apparatus in FIG. 1, 2A showing the relative planar positions in the front-back (i.e. longitudinal), left-right (i.e. transverse) directions, and 2B showing the relative positions in the vertical direction.

The relative positions of the various components within outside case 2 of projection display apparatus 1 are shown in FIGS. 2A and B. Projection display apparatus 1 of the present embodiment comprises a light source lamp unit 8; an optical lens unit 9 comprising a color separation means for separating the white light beam emitted from the light source lamp unit into colored light beams of the three primary colors, three light valves for modulating the light beams of each of the separated colors, and a color synthesis means for combining the modulated light beams of each of the modulated colors; a projection lens unit 6 for projecting the combined modulated light beams onto a screen; and a power supply unit 7.

An interface circuit board 11 on which the input/output interface circuit is mounted, video circuit board 12 on which the video signal processing circuit is mounted, and control circuit board 13 on which the control circuit is mounted, are also provided. In addition to these, drive unit 890 for reading, writing, etc., a floppy disk, IC card, PCMCIA card or other recording medium, is provided.

The relative positions of these components are described with reference to FIG. 2. Light source lamp unit 8 is disposed within outside case 2 offset slightly to one side at the back thereof. Projection lens unit 6 is disposed in the middle of the apparatus front. Optical lens unit 9 and power supply unit 7 are disposed one above the other between light source lamp unit 8 and projection lens unit 6.

Interface circuit board 11 on which the input/output interface circuit is mounted oriented front-back to the apparatus is disposed on one side of optical lens unit 9, and parallel to this is disposed video circuit board 12 on which the video signal processing circuit is mounted. Above light source lamp unit 8 and optical lens unit 9 is disposed control circuit board 13 for apparatus drive control. Speakers 14R and 14L are placed at the right and left corners in the front of the apparatus. Cooling intake fan 15 is disposed above optical lens unit 9, and exhaust fan 16 is placed at the side of the apparatus, behind light source lamp unit 8.

Light Source Lamp Unit

Figure 4:
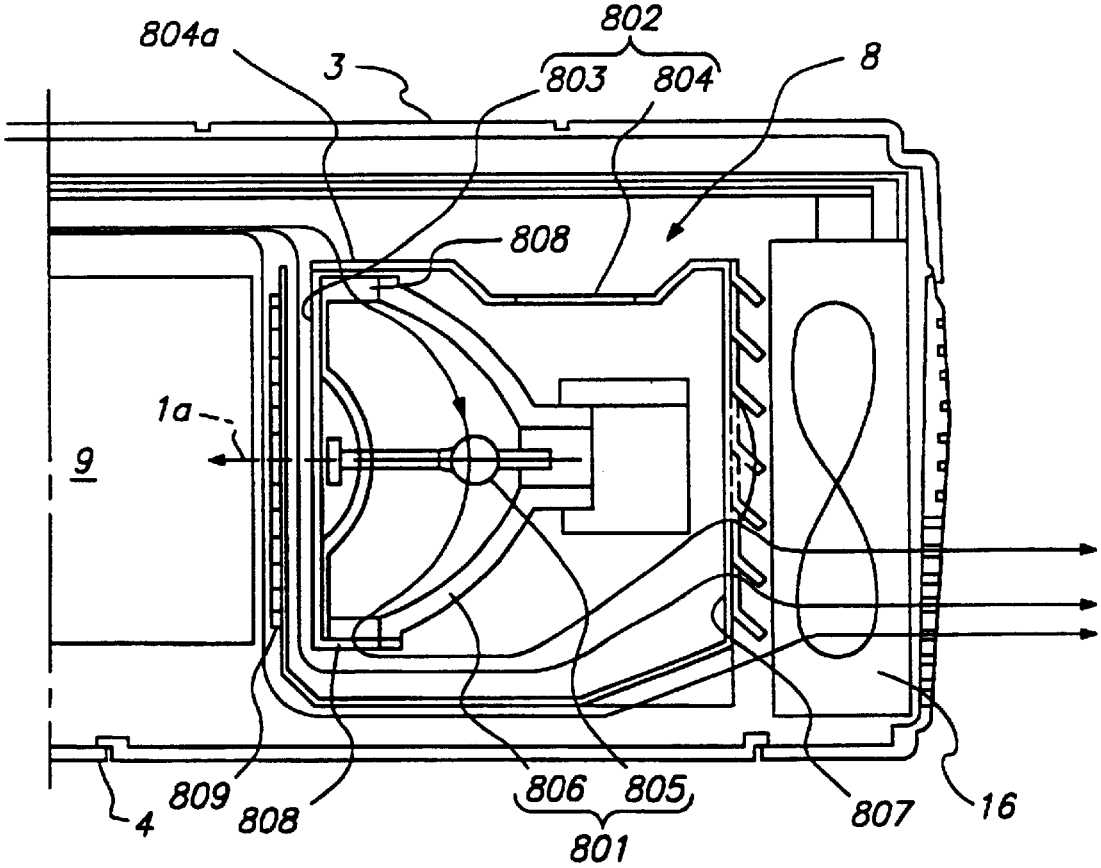
FIG. 4 is a simple cross section view of the construction of the light source lamp unit in the apparatus in FIG. 1.

Light source lamp unit 8 is described with reference to FIG. 2A and FIG. 4. Light source lamp unit 8 includes light source lamp 801 and the substantially rectangular parallelopiped-shaped lamp housing 802 in which lamp 801 is housed. In the present embodiment lamp housing 802 is a double-walled structure of inner housing 803 and outer housing 804. Light source lamp 801 includes a halogen lamp or other lamp body 805, and reflector 806, and emits the light from lamp body 805 along optical axis 1a toward optical lens unit 9.

The front of outer housing 804 in the optical axis 1a direction has an opening in which ultraviolet filter 809 is mounted. Plural slit group 807 for passing the cooling air is formed in the back in the optical axis 1a direction. Light source lamp 801 is mounted to inner housing 803. Air cooling through-holes 804a are formed around the top of outer housing 804. A cooling air flow is introduced from through-holes 804a by the action of exhaust fan 16 over lamp body 805. The flow of this cooling air is shown by the solid arrows in FIG. 4. After thus cooling lamp body 805, the cooling air flows along reflector 806, passes through-holes 808 formed in the bottom part thereof, and is vented to the outside by exhaust fan 16.

It should be noted that inner housing 803 and light source lamp 801 are formed as a single unit in the present embodiment. The lamp can be replaced by removing and replacing this unit.

Optical Lens Unit

Figure 3:
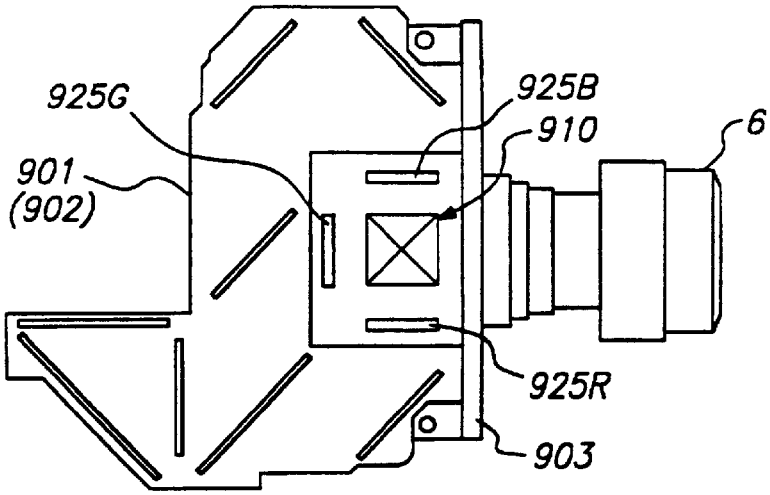
FIG. 3 shows the relative planar positions of the optical lens unit and projection lens unit in the apparatus in FIG. 1.

A plan view of optical lens unit 9 is shown in FIG. 3. As shown in this figure, optical lens unit 9 includes the optical elements other than prism unit 910, which functions as the color synthesis means, disposed vertically between the top and bottom light guides 901 and 902. Top light guide 901 and bottom light guide 902 are substantially identical in shape and are placed parallel to each other. Top light guide 901 and bottom light guide 902 are also fastened by set screws to upper case 3 and lower case 4, respectively. The top and bottom light guides 901 and 902 are similarly fastened by set screws to prism unit 910.

Figure 2B:
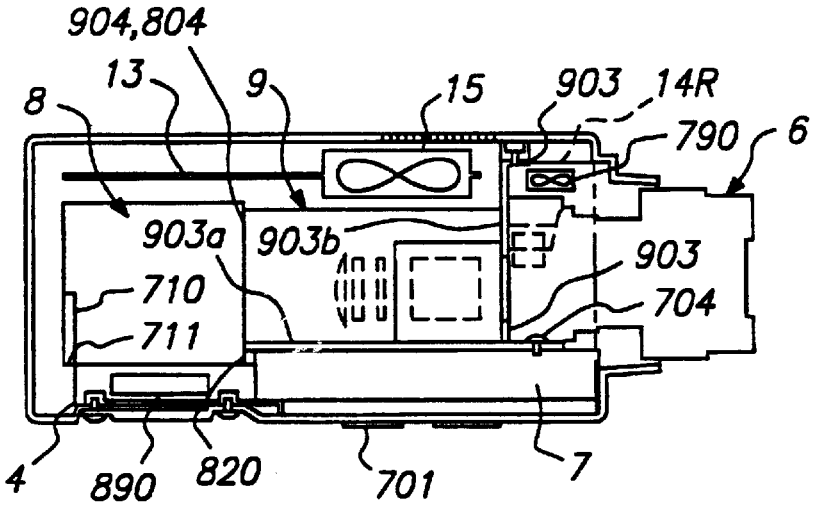

Prism unit 910 is fastened by set screws to the back of head panel 903, which is a thick diecast member. As shown in FIG. 2B, this head panel 903 has a cross sectional shape comprising horizontal panel member 903a extending front to back, and vertical panel member 903b rising perpendicularly from the top of horizontal panel member 903a, and extends right to left across the full width of the apparatus.

The base of projection lens unit 6 is similarly fastened by set screw to the front of this head panel 903. The present embodiment is therefore constructed with prism unit 910 and projection lens unit 6 fastened as a single unit with head panel 903 disposed therebetween. Both of these parts are thus integrated on opposite sides of a high rigidity head panel 903. As a result, misalignment of these components does not occur even if an impact force acts on the side of projection lens unit 6.

This optical lens unit 9 is covered at top and bottom by top light guide 901 and bottom light guide 902, and is surrounded by side panel 904, thus forming a unit. As shown in FIG. 2B, the part of side panel 904 of optical lens unit 9 adjacent to light source lamp unit 8 is fastened to outer housing 804, which is the side case of light source lamp unit 8. In place of this configuration, it is also possible for the adjacent parts of both units 9 and 8 to share a common case, in which case the two units are effectively integrated as a single unit.

As shown in FIG. 2B, horizontal panel member 903a of head panel 903, which is a structural member, extends toward the back of the apparatus to a position in contact with outer housing 804 of light source lamp unit 8. Outer housing 804 is then fixed to head panel 903 using a screw or other fastened 820.

Because light source lamp unit 8 and optical lens unit 9 are thus integrated in the present embodiment, misalignment between the positions of these units will not occur even when an impact force is applied. Integration also increases the rigidity of these units, and there is less chance for misalignment between the positions of the optical elements contained in these units.

As also described above, optical lens unit 9 is integrated with projection lens unit 6 by means of head panel 903, which is a structural member. As a result, light source lamp unit 8, optical lens unit 9, and projection lens unit 6 are integrated together. Since the units comprising the optical path are integrated together in the present invention, there is an extremely small chance of misalignment occurring between the positions of these units even when impact is applied. As a result, misalignment between the units or between the optical elements in the units causing, for example, color irregularities or luminance irregularities resulting in reduced projection image quality does not occur.

As thus described, the relative positions of the optical axes of light source lamp unit 8, optical lens unit 9, and projection lens unit 6 will not become misaligned. The optical characteristics of the apparatus can therefore also be appropriately maintained.

Optical System

Figure 5:
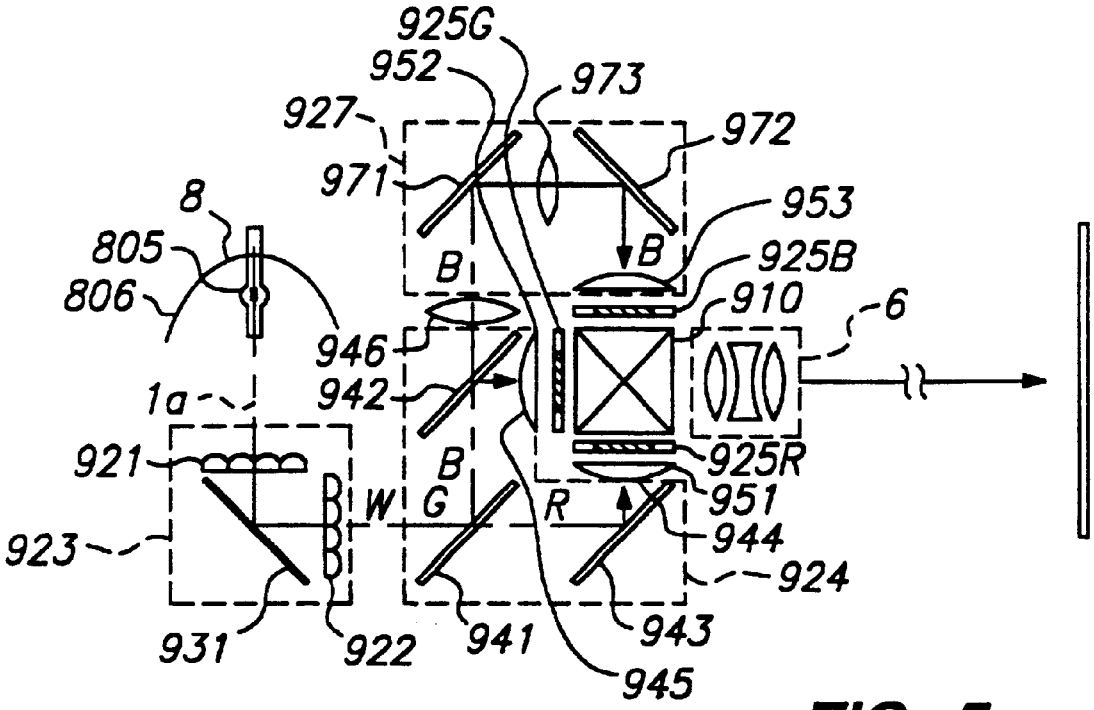
FIG. 5 is a simple configuration diagram of the optical system assembled in the apparatus in FIG. 1.

The optical system assembled as in the present embodiment is described with reference to FIG. 5.

The optical system of the present embodiment comprises lamp body 805 described above; illumination optics system 923 comprising integrator lenses 921 and 922, which are uniform lighting optical elements; color separation optics system 924 for separating the white light beam W emitted from illumination optics system 923 into red, green, and blue color light beams R, G, and B; three liquid crystal light valves 925R, 925G, and 925B as the light valves for modulating the color light beams; prism unit 910 as the color synthesis optics system for recombining the modulated color light beams; and projection lens unit 6 for projection enlarging the mixed light beams to a screen.

Light guide 927 is also provided for guiding the blue light beam B of the color light beams separated by color separation optics system 924 to the corresponding liquid crystal light valve 925B.

A halogen lamp, metal halide lamp, xenon lamp, or other lamp may be used as light course lamp 805. Uniform illumination optics system 923 comprises reflecting mirror 931 for perpendicularly bending the central optical axis 1a of the light emitted from the illumination optics toward the front of the apparatus. Integrator lenses 921 and 922 are placed on opposite sides of reflecting mirror 931 perpendicularly to each other.

Color separation optics system 924 comprises blue-green reflecting dichroic mirror 941, green reflecting dichroic mirror 942, and reflecting mirror 943.

The blue light beam B and green light beam G contained in the white light beam W are first reflected perpendicularly by blue-green reflecting dichroic mirror 941 toward green reflecting dichroic mirror 942. The red light beam R passes through mirror 941, is reflected perpendicularly by reflecting mirror 943 therebehind, and is emitted toward prism unit 910 from the red light beam emitter 944. Regarding the blue and green light beams B and G reflected by mirror 941, only the green light beam G is perpendicularly reflected by green reflecting dichroic mirror 942, and emitted from green light beam emitter 945 to the color synthesis optics system. The blue light beam B passing through mirror 942 is emitted to the light guide system from the blue light beam emitter 946.

The distance from the white light beam emitter of the uniform illumination optics system to the emitter 944, 945, and 946 of each color light beam in color separation optics system 924 is designed to be equal in the present embodiment.

A condenser lens 951, 952, and 953, respectively, is disposed on the emitting side of the emitter 944, 945, and 946 of each color light beam in color separation optics system 924. As a result, the color light beams emitted from the respective emitters are incident on these condenser lenses 951, 952 and 953 are made parallel.

Of the parallel color light beams R, G, and B, the red and green light beams R and G are incident on liquid crystal light valves 925R and 925G and modulated to contain the image information of the respective light color. Specifically, these light valves are switch-controlled according to the image information by a drive means not shown in the figures, thereby modulating each color of light passing through the light valve. This drive means may be a conventional design. The blue light beam B, however, is guided to the corresponding liquid crystal light valve 925B by light guide 927, and is similarly modulated thereby according to the image information. The light valves of the present embodiment may use, for example, a polysilicon TFT as the switching element.

Light guide 927 comprises incidence-side reflecting mirror 971, emitting-side reflecting mirror 972, middle lens 973 disposed therebetween, and condenser lens 953 disposed in front of liquid crystal panel 925B. The optical path of each color light beam, specifically the distance from lamp body 805 to each liquid crystal panel, is longest for the blue light beam B, and the light loss of this light beam is therefore greatest. Light loss can be minimized, however, by inserting light guide 927. The optical path of each color light beam can thus be made effectively equivalent.

The color light beams modulated by passing through liquid crystal panels 925R, G, and B are incident on color synthesis optics system in the present embodiment comprises prism unit 910. The color image remixed here passes projection lens unit 6 and is projection enlarged on a screen at a predetermined position.

Note that in addition to the above configuration, a ½ wavelength plate is preferably disposed in the path of the light beam of each color to align the light beam of each color to S polarized light in the present embodiment. By thus making it possible to use only S polarized light, color separation by the dichroic mirrors can be improved when compared with using random polarized light in which P polarized light and S polarized light are mixed. Furthermore, because light guide 927 reflects the light beams using mirrors, and the reflectivity of S polarized light is better than that of P polarized light, this configuration also offers the benefit of being able to reduce light loss.

Power Supply Unit

As shown in FIG. 2, the components of power supply unit 7 are built into metal shield case 701, which prevents electrical and magnetic noise generated in this part from leaking outside. Shield case 701 is sized to extend between the right and left side walls of outside case 2 of the apparatus. This power supply unit 7 is disposed below optical lens unit 9. Specifically, it is placed in the space between bottom light guide 902 defining the bottom surface of optical lens unit 9, and lower case 4 defining the bottom of the apparatus. Therefore, units 9 and 7 are disposed in a vertically overlapping configuration.

Because the dimensions and weight of power supply unit 7 are greater than those of the other units, the positioning of unit 7 greatly affects the overall dimensions and balance of the apparatus. For example if it is placed on the same plane as the other units as in a conventional apparatus, the front-back, right-left dimensions (i.e. length and width) of the apparatus become large. This limits where the apparatus can be placed and makes it less portable.

In the present embodiment, however, power supply unit 7 is placed vertically below optical lens unit 9. It may also be placed above optical lens unit 9. Because power supply unit 7 is heavy, however, it is often better to place it on the bottom to enhance the stability of the apparatus when placed on a table, for example.

The top of shield case 701 covering power supply unit 7 faces head panel 903. The top part of shield case 701 can therefore be used in common with head panel 903. This also makes it possible to reduce the number of parts, and to reduce the weight of unit 7.

Because power supply unit 7 is stacked vertically with optical lens unit 9, the apparatus becomes higher. To avoid this, it is necessary to make power supply unit 7 as thin as possible. Power supply unit 7 comprises a primary side and a high voltage power supply part. It is necessary to cover the inside walls of the shield case with an insulation panel made of resin in order to sufficiently insulate this part from shield case 701 and to reduce the gap therebetween. By thus narrowing the gap between the insulation panel and circuit elements, power supply unit 7 can be made thinner.

However, when the gap between the insulation panel and circuit elements is narrowed, heat produced by the circuit elements can easily pass into the unit. To prevent this an auxiliary cooling fan 790 is preferably disposed as shown in FIG. 2B to force cooling air into power supply unit 7. The cooling air introduced to power supply unit 7 flows through the inside of power supply unit 7, passes through the ventilation holes (not shown in the figure) opened in light source lamp unit 8, and may be exhausted outside the unit by exhaust fan 16. It will be obvious, however, that the air that cooled liquid crystal light valves 925R, 925G, and 925B may also be forced into power supply unit 7 to improve the cooling efficiency of power supply unit 7.

It should be noted that optical lens unit 9 is integrally connected with power supply unit 7 by means of screws or other fastener. Power supply unit 7 is further fastened to outside case 2 by means of screws or other fastener. Power supply unit 7 and optical lens unit 9 may also both be fastened to outside case 2. By providing a common fastening bracket secured to lower case 4 in conjunction with this joint mounting, the apparatus can be made compatible with a suspended installation while reducing the load on optical lens unit 9.

By fastening front case 5 to power supply unit 7 with screws, a handle can be disposed on the front case to ease or balance the load of the power supply unit when the apparatus is picked up.

Drive Unit Placement

Projection display apparatus 1 also includes drive unit 890 from reading a floppy disk, IC card, PCMCIA (card), or other medium. This may, for example, be a floppy disk drive. Drive unit 890 can be placed in the space below light source lamp unit 8. Alternatively, it can be placed in the space below optical lens unit 9 where optical lens unit 9 does not overlap power supply unit 7. Drive unit 890 is disposed in the present embodiment using the space below the position where illumination optics system 923 is disposed.

Applications in Industry

The large optical lens unit and power supply unit are disposed in a vertically stacked configuration in a projection display apparatus according to the present embodiment. It is therefore possible to reduce the front-back and right-left dimensions (i.e. length and width) of the overall apparatus. As a result, a projection display apparatus that is conveniently portable and requires little installation space can be achieved.

If compactness in particular is desired, the vertically-oriented embodiment of the present invention can be utilized while retaining the benefits of a flat layout (for example, preventing dust from clinging to the mirrors), and design improvements can be further achieved.

If the heavy power supply unit is disposed below the optical lens unit, the center of gravity of the overall apparatus is lowered. The apparatus is therefore stable when placed on a table, for example, and internal components will not shake even when an impact force is applied from the side. Because the projection display apparatus is constructed with the rigid power supply unit supporting the optical lens unit even when suspended, it is easier to prevent optical system performance deterioration. It is obviously also possible to improve the impact resistance and magnetic noise shield effect, and improve reliability. This construction is appropriate particularly to apparatuses designed for greater compactness, and projection display apparatuses using low cost single panel liquid crystal light valves.

If in addition to the above configuration the optical lens unit is constructed with a head panel as a structural member extending from side-to-side or transversely in the apparatus with the horizontal panel part of said head panel also functioning as at least part of the shield case covering the power supply unit, the apparatus can be made smaller and more compact by the amount both parts are used in common.

In a projection display apparatus including a drive unit for reading an information recording medium, a configuration in which said drive unit is disposed between the bottom panel part of the outside case and the light source lamp unit is used in the present invention. As described above, the present invention uses an arrangement in which the power supply unit and optical lens unit are stacked vertically. As a result, dead space is created below the light source lamp unit. If this dead space is used to contain the drive unit, it is possible to provide a drive unit without enlarging the apparatus.

Because the optical lens unit and power supply unit are not the same size, there is also a space below the optical lens unit where the power supply unit is not present. The drive unit may be positioned in this dead space, as an alternative.

It is also possible in the present invention to fasten the light source lamp unit to the optical lens unit, or to integrate these as a single unit. In addition, a configuration may be used in which the light source lamp unit and projection lens unit are fastened to the head panel, which is a structural member of the optical lens unit. Because the overall rigidity is increased by thus integrating two or three units, misalignment between the positions of the light source lamp unit and optical lens unit will not occur even if an impact force acts on the apparatus as a result of dropping, collision, etc. Furthermore, because misalignment between the optical axes of each unit also does not occur, it is also possible to avoid reductions in the quality of the projected image.

It is necessary to provide a cooling fan specifically for the power supply unit to cool the transistors, diodes, and capacitors of the internal step-up circuit components. It is possible to use a common fan for cooling the light valve unit in the present invention, thereby achieving such benefits as a size reduction, cost reduction, etc., in the power supply unit.

What is claimed is:

1. A [projection display apparatus] *projector,* comprising:

a light source lamp [unit];

an optical [lens unit] *system* comprising a color [separation means for separating] *separator that separates* a light beam emitted from said light source lamp [unit] into colored light beams [of three primary colors], [three] light valves [for modulating] *that modulate* the light beams of each of the separated colors, and a color [synthesis means for synthesizing the] *synthesizer that synthesizes a* modulated light beams of each of the modulated colors;

a projection lens [unit for projecting the] *that projects the* synthesized modulated light beams [onto a screen];

a power supply [unit]; and an outside case in which each of said light source lamp, optical [lens] *system*, projection lens and power supply [units] is assembled;

wherein said projection lens [unit] is positioned in a front part of said outside case, said light source lamp [unit] is positioned in a back part of said outside case, and said optical [lens unit] *system* and power supply [unit] are disposed stacked together in a vertical direction in between said projection lens [unit] and said light source lamp [unit], and wherein said optical [lens unit] *system* comprises a head panel as a structural member extending transversely in the [apparatus] *projector*, said head panel comprises a horizontal panel part extending longitudinally in the [apparatus] *projector*,and wherein said horizontal panel part also forms at least part of a shield case covering said power supply[unit].

2. A [projection display apparatus] *projector* according to claim 1 wherein said power supply [unit] is disposed below said optical [lens unit] *system*.

3. A [projection display apparatus] *projector* according to claim 1 further comprising a drive [unit for] *device that* at least [reading] *reads* an information recording medium; and wherein said drive [unit] *device* is disposed between a bottom panel part of said outside case and said light source lamp[unit].

4. A [projection display apparatus] *projector* according to claim 2 further comprising a drive [unit for] *device that* at least [reading] *reads* an information recording medium, and wherein said drive [unit] *device* is disposed below said optical [lens unit] *system* in an area next to said power supply[unit].

5. A projection display apparatus according to claim 1 wherein said light source lamp [unit] is integrally connected with said optical [lens unit] *system*.

6. A [projection display apparatus] *projector* according to claim 5 wherein said light source lamp [unit] is fixed to said horizontal panel part of said head panel.

7. A [projection display apparatus] *projector* according to claim 6 wherein said head panel comprises a perpendicular panel part rising vertically from said horizontal panel part, and wherein said projection lens [unit] is fixed to said perpendicular panel part.

8. A [projection display apparatus] *projector* according to claim 1, *further* comprising:

a cooling fan disposed above said optical [lens unit] *system*, [and wherein said optical lens unit comprises a head panel, and comprising]

air holes formed in said head panel to enable forced air from said cooling fan to enter said optical [lens unit] *system*, and intake holes formed in said power supply [unit].

* * * * *